May 17, 1932. A. F. MASURY 1,858,783
SPRING MOUNTING FOR STUB AXLES
Filed Feb. 9, 1931
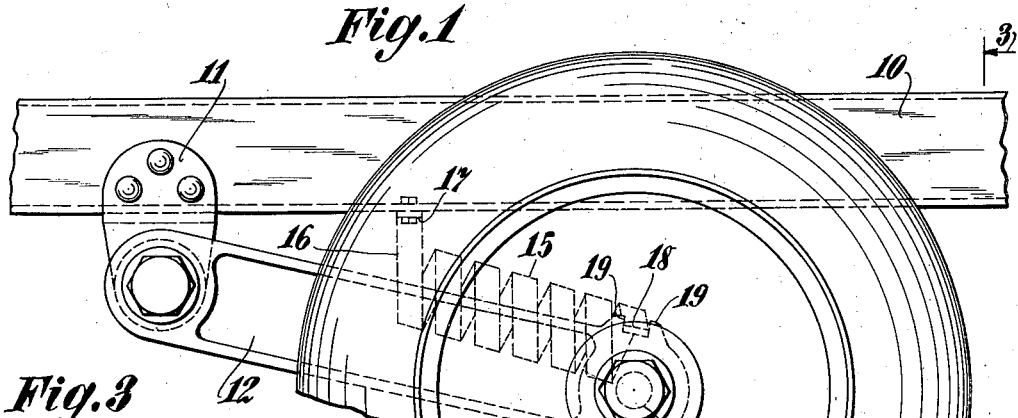
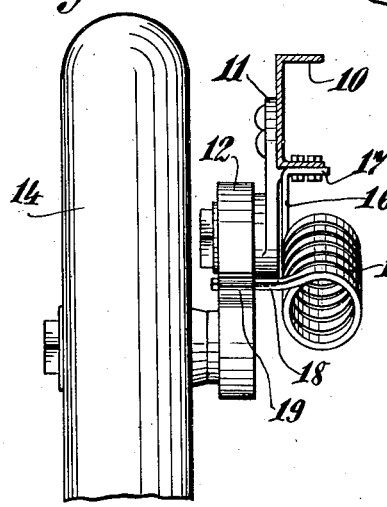
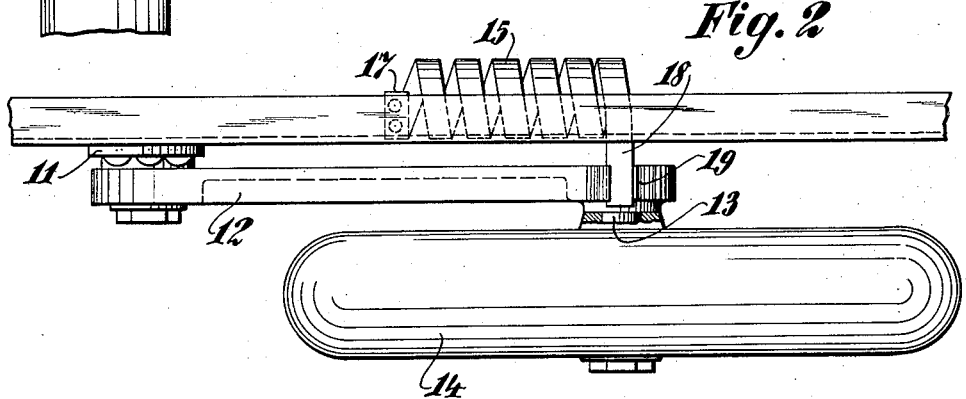
INVENTOR
Alfred F. Masury,
BY
Redding, Greeley, O'Shea + Campbell
HIS ATTORNEYS Patented May 17, 1932

1,858,783

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

SPRING MOUNTING FOR STUB AXLES

Application filed February 9, 1931. Serial No. 514,384.

The present invention relates to spring mountings for independently mounted stub axles and includes, more specifically, an improved spring mounting by means of which the load carried by the stub axles is effectively sprung. In order that the center of gravity of a vehicle chassis may be lowered, it has been proposed to mount the wheels upon stub axles which are secured to the vehicle frame independently of one another. A suitable form of spring suspension is thus required to cushion effectively, the vehicle loads and, at the same time serve as an effective weight carrying and load transmitting member for the chassis. In order that free movement of the stub axle with respect to the frame may be permitted, an object of the present invention is to provide an improved form of spring mounting for stub axles of this character whereby free movement of the axle is permitted about its pivot point, at the same time providing the desired cushioning effect for the vehicle chassis.

A further object of the invention is to provide a spring mounting of the above character which is readily manufactured and assembled and which is fully accessible and does not require a great amount of space upon the frame.

Further objects, not specifically enumerated above, will be apparent as the invention is described in greater detail in connection with the accompanying drawings, wherein;

Figure 1 is a view in side elevation, showing a spring constructed in accordance with the present invention.

Figure 2 is a plan view of the construction shown in Figure 1.

Figure 3 is a view in rear elevation, showing the spring mounting of Figures 1 and 2.

Referring to the above drawings, a vehicle side frame member is shown at 10 having a bracket 11 upon which is journaled an arm 12. A stub axle 13 is carried by the arm 12 and mounts a wheel 14 in any approved fashion.

Upon the underside of the frame member 10, a spiral spring 15 is mounted, this spring having an extension 16 and a mounting flange 17 to be secured to the frame member. The spring further has an extension 18 at the other end thereof which is adapted to engage the top of the arm 12, adjacent the wheel mounting extremity thereof. The top of the arm is preferably formed with shoulders 19 to position the extension 16 properly.

It will thus be seen that any motion of the center of the wheel up or down will cause the winding or unwinding of the spring and, by selecting a spring of the desired characteristics, the frame is effectively sprung upon the plurality of wheels.

It will thus be seen that each arm upon the vehicle functions independently of the others and free pivotal movement thereof is permitted by the foregoing spring suspension, save in respect to the cushioning effect of the spring 13.

While the invention has been described with specific reference to the accompanying drawings, it is not to be limited, save as defined in the appended claim.

I claim as my invention:

In combination with a vehicle frame and wheel, an arm journaling the wheel, a bracket for mounting the arm on the frame for movement about a horizontal axis and in a vertical plane offset with respect to the vertical plane of the vehicle frame, and a torsional coil spring secured to the frame at one end and engaging the arm at the other end, the spring having its axis substantially parallel to the axis of the arm and being mounted in such manner that vertical motion of the arm produces torsional stresses in the spring coils about the axis thereof.

This specification signed this 6th day of February, A. D. 1931.

ALFRED F. MASURY.